United States Patent [19]

Urso

[11] Patent Number: 4,775,112

[45] Date of Patent: * Oct. 4, 1988

[54] APPARATUS FOR LINE CASTING AND REELING WITH POWER ASSISTED CAST

[76] Inventor: Charles L. Urso, 215 Newton St., Waltham, Mass. 02154

[*] Notice: The portion of the term of this patent subsequent to Mar. 22, 2003 has been disclaimed.

[21] Appl. No.: 68,626

[22] Filed: Jun. 30, 1987

Related U.S. Application Data

[63] Continuation-in-part of Ser. No. 830,648, Feb. 19, 1986, abandoned, which is a continuation-in-part of Ser. No. 736,424, May 20, 1985, Pat. No. 4,577,807, which is a continuation-in-part of Ser. No. 558,821, Dec. 7, 1983, abandoned.

[51] Int. Cl.⁴ .............. A01K 89/012; A01K 89/017
[52] U.S. Cl. ........................... 242/84.1 A; 43/21; 242/84.2 C; 242/84.21 R
[58] Field of Search .......... 242/84.2 C, 84.2 G, 242/84.2 F, 84.2 D, 84.1 A, 84.3, 84.21 R, 215; 43/4.5, 21

[56] References Cited

U.S. PATENT DOCUMENTS

| | | | |
|---|---|---|---|
| 2,613,882 | 10/1952 | Small | 242/84.21 R |
| 2,753,130 | 7/1956 | Sjogren | 242/84.21 R |
| 2,776,515 | 1/1957 | Lynch | 242/84.1 A X |
| 2,866,291 | 12/1958 | Duell | 242/84.2 D X |
| 2,931,592 | 4/1960 | Sloan | 242/84.21 R |
| 2,980,361 | 4/1961 | Nachtrieb | 242/84.3 X |
| 3,675,870 | 7/1972 | Ride et al. | 242/84.1 A |
| 3,826,439 | 7/1974 | Moon | 242/84.1 A X |
| 3,874,610 | 4/1975 | Wahiberg | 242/84.1 A |
| 3,932,954 | 1/1976 | Wyreski | 242/84.1 A X |
| 4,005,832 | 2/1977 | Yamazaki | 242/84.21 R |
| 4,108,392 | 8/1978 | Masclet | 242/84.1 A X |
| 4,515,324 | 5/1985 | Barton | 242/84.1 A |
| 4,577,807 | 3/1986 | Urso | 242/84.2 C |
| 4,598,878 | 7/1986 | Steffan | 242/84.1 A |

Primary Examiner—Stuart S. Levy
Assistant Examiner—Joseph J. Hail, III
Attorney, Agent, or Firm—Hamilton, Brook, Smith & Reynolds

[57] ABSTRACT

A line casting apparatus including a line traversing cam encircling an open-ended spool. A hand crank and gear train drive the spool and the line cam to rotate them at a different rate relative to each other. This produces a high number of even-wound turns of line, per layer, upon the spool and results in a very orderly peeling of the line during a cast. A motor is drivingly connected to the spool to rotate the same during the cast so that centrifugal force overcomes line peel resistance to result in casts of greater distance. Upon rotation of the hand crank, a nonspinning bail is smoothly and automatically tripped to pivot to a line retrieval position for line pick-up and winding. The nonspinning bail holds the line within reach of the index finger of the hand normally holding the casting apparatus. During winding, a clutch connects the spool with the gear train, line traversing cam, and hand crank. A trigger, which controls the clutch and the motor, is positioned for convenient operation with the mentioned index finger.

30 Claims, 4 Drawing Sheets

APPARATUS FOR LINE CASTING AND REELING WITH POWER ASSISTED CAST

RELATED PATENTS

This invention is a continuation-in-part of application Ser. No. 830,648 filed Feb. 19, 1986 (now abandoned) which is a continuation-in-part of application Ser. No. 736,424 filed May 20, 1985 (now U.S. Pat. No. 4,577,807) which is a continuation-in-part of application Ser. No. 558,821 filed Dec. 7, 1983 (now abandoned).

TECHNICAL FIELD

This invention relates to line casting and reeling devices and specifically to those devices having means for line pay-off along a direction parallel to the axis of rotation of a line spool wherein the spool is motor powered.

BACKGROUND OF THE INVENTION

A type of reel widely used for casting line involves an apparatus in which line peels off a spool in a direction parallel to the spool axis during the cast. Preference for this type of casting reel is largely due to its ability to cast without backlash or inertia caused snarling of line. However, the casting distance that can be achieved with the reel is limited in part by the line peel resistance at the spool. In order to reduce the resistance it has been necessary to use relatively thin monofilament lines. It would be of great advantage, therefore, to provide an improved apparatus for casting braided lines or heavy grade monofilament lines without backlash. Braided lines, for example, are available in very high strength grades and their limpness insures good line behavior and control. An apparatus that can effectively cast and reel heavy service lines, without backlash, could have broad applications. In addition to conventional uses including heavy game fishing, it could be used in water related rescue and recovery operations. The apparatus could also be a useful tool in other activities where a reliable method of casting strong lines is needed.

The present invention provides an apparatus having the above mentioned capabilities. It could be used in concert with a conventional line casting rod or with other types of line launching devices.

SUMMARY OF THE INVENTION

The line casting apparatus includes a line traversing cam encircling an open-ended spool. A hand crank and gear train drive th spool and the line cam to rotate them at a different rate relative to each other. This produces a high number of even-wound turns of line, per layer, upon the spool and results in a very orderly peeling of the line during a cast. A motor is drivingly connected to the spool to rotate the same during the cast so that centrifugal force overcomes line peel resistance to result in casts of greater distance.

Upon rotation of the hand crank, a nonspinning bail is smoothly and automatically tripped to pivot to a line retrieval position for line pick-up and winding. The nonspinning bail holds the line within reach of the index finger of the hand normally holding the casting apparatus. During winding, a clutch connects the spool with the gear train, line traversing cam, and hand crank. A trigger, which controls the clutch and the motor, is positioned for convenient operation with the mentioned index finger.

Also included is an adjustable speed control, a spool drag, and an antireverse.

An objective of the casting apparatus is to provide a means of casting heavy service or high test strength lines over relatively long distances without backlash.

A more detailed explanation of the apparatus is provided in the following description and claims, and is illustrated in the accompanying drawings.

BRIEF DESCRIPTION OF THE DRAWINGS

The accompanying drawings in combination with the description herewith, illustrate features and advantages of the invention. Like reference characters in different views refer to the same parts. The drawings are intended to illustrate principles of the invention and are not necessarily to scale and in which drawings.

DETAILED DESCRIPTION OF THE INVENTION

Figure 3:
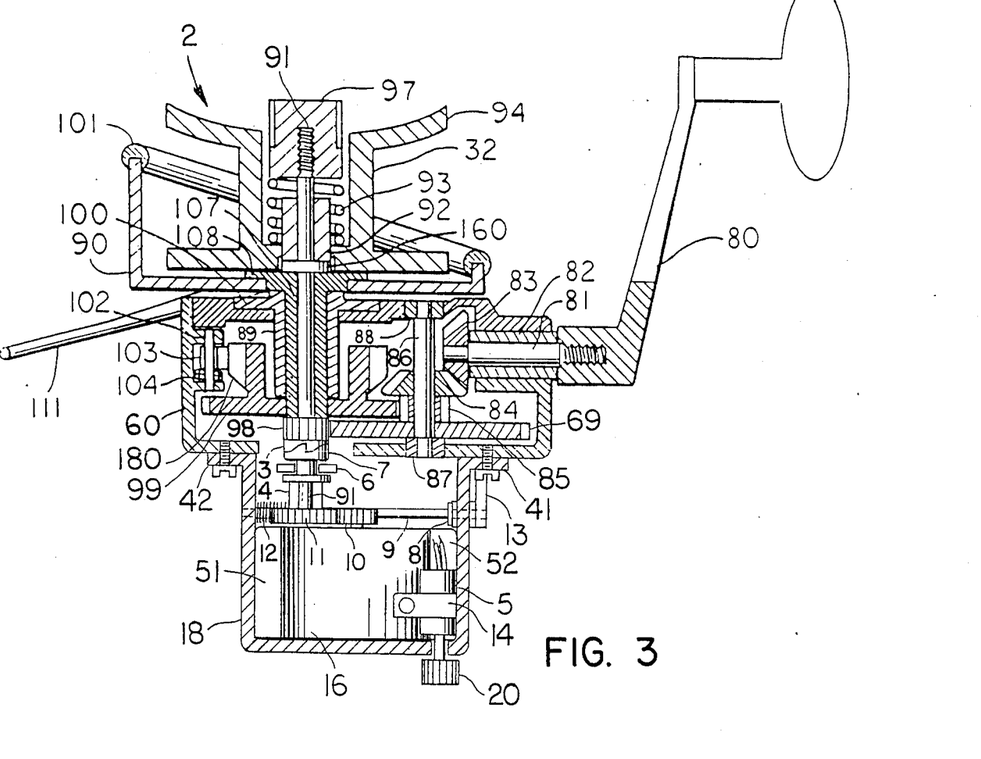
FIG. 3 is a cross-sectional view of the invention taken through the lines 3—3 of FIG. 7.

An apparatus for line casting and reeling is referred to generally by the numeral 2 in FIG. 3. In that figure, a spool 94 having a hollow core 32 is provided with an internal bushing 92 which is coaxially fixed in an aperture in the spool hub. The spool 94 and bushing 92 are coaxially and rotatably mounted to a first portion of a spindle shaft 91. A second portion of the spindle shaft 91 is coaxially journaled in a first bearing 107. A first portion of bearing 107 is formed as a flange 108 to which a cylindrical support cup 90 is coaxially fixed.

The cylindrical support cup 90 serves to support an elliptically shaped rail 101 positioned such that its elliptical center is located at the midpoint of the spool core axis. The minor axis of the ellipse is perpendicular to the spool axis. The major axis of the ellipse is tilted at an oblique angle relative to the spool axis. The distance between a pair of lines normal to the spool axis, wherein one line intersects one vertex of the ellipse and the other line intersects the other vertex of the ellipse, is substantially the length of the spool core 32. Thus, the combination of the rail 101 and support cup 90 form a line traversing cam which encircles spool 94. The elliptical rail is constructed of a material that lends itself to produce low sliding friction (as many plastics and polished metals do) or it is coated with such a material.

Coaxially combined with shaft 91 is a flange 160 which prevents bushing 92 (and the spool) from contacting flange 108. Within the hollow core of the spool 94, a drag spring 93 encircles a portion of shaft 91. A knob 97, internally threaded to mate with a threaded portion of shaft 91, provides an adjustable means to compress the drag spring 93 between the knob 97 and the spool 94. Thus, an adjustable drag is formed to controllably limit the ability of the spool 94 to rotate independently of the rotation of shaft 91.

First bearing 107 has a second portion journaled in a second bearing 89. An end portion of bearing 89 is formed as a flange 100 which is fixed into an annular recess encircling an aperture in the wall of a front housing 60. The main body of bearing 89 extends through the aperture into housing 60.

A third portion of spindle shaft 91 passes through a gear/clutch 98,3 which comprises a first gear 98 fixed to a spiral-jaw clutch receiving portion 3. Spindle shaft 91 can rotate within and independently of gear/clutch 98,3.

A third portion of first bearing 107 is coaxially fixed to a second gear 99 which is fixedly coaxially combined with a driver multilobed cam or ratchet wheel 180. A hollow interior in the ratchet wheel 180 allows the wheel to encircle bearing 89 for efficient use of space within the housing 60.

A crank 80 is coaxially fixed to an end portion of a first shaft 81. A bearing 82, supported by the housing 60, receives a journaled portion of shaft 81 for rotation therein. A first bevel gear 83 is coaxially fixed on an opposite end portion of shaft 81. Operatively engaged with bevel gear 83 is a second bevel gear 84 which is coaxially fixed to a first portion of a second shaft 86. A third gear 85 and a fourth gear 69 are coaxially fixed to a second portion and a third portion of shaft 86, respectively. Supported by the housing 60 are bearings 87 and 88 which receive respective end portions of shaft 86 for rotation therein. In mesh engagement with fourth gear 69 is gear/clutch 98,3 and in mesh engagement with third gear 85 is second gear 99.

Attached to the back of front housing 60 is a cubic shaped rear housing 18. The attachment is achieved with screws passing through flanges 41,42, extending from lateral edges of housing 18, and into a back wall of housing 60.

A fourth portion of spindle shaft 91 extends into housing 18. A slidable spiral-jaw clutch portion 7 is keyed to the spindle shaft fourth portion and is axially slidable thereon. Thus, clutch portion 7 can slide in and out of engagement with gear/clutch 98,3. The key 50 (FIG. 1), by which clutch portion 7 is keyed to the spindle shaft fourth portion, is removable to facilitate assembly of the components mounted on the spindle shaft 91. When slidable clutch portion 7 is engaged, hand crank 80 is drivingly connected, by way of the described gear train, to the spindle shaft. When clutch portion 7 is disengaged, the spindle shaft and spool 94 are disconnected from the gear train, the line traversing cam and the hand crank.

Fixedly attached to a rear end portion of spindle shaft 91 is a motor driven gear 11 (FIG. 3). In mesh engagement with gear 11 is a drive gear 10 which is fixedly mounted on a drive shaft of a permanent magnet DC motor 16. A set of rib brackets 51,52,53,54 (FIGS. 3 and 7) extending from the motor housing hold the motor in position within housing 18.

The motor 16 and gears 10,11 are selected to drive the spindle shaft 91 and spool 94 at a rotation rate approximately equal to the average rate at which the turns of line peel from the spool during an early portion of a typical cast. A rheostat 5, controlled by a knob 20, is wired in series with the motor (see FIG. 8) and provides a means for adjusting the motor speed to meet specific casting conditions. The rheostat is positioned in a corner within housing 18 and is attached to the housing with a bracket 14. Further discussion on the use of rheostat 5 is provided along with other operational details hereinafter.

Power for motor 16 can be provided by conventional means such as batteries or a rechargeable power pack which can be located within a hollow handle of a casting rod. Alternatively, a battery or power pack could be clipped to the handle of a conventional casting rod. The power source can be electrically connected as shown in FIG. 8.

Figure 7:
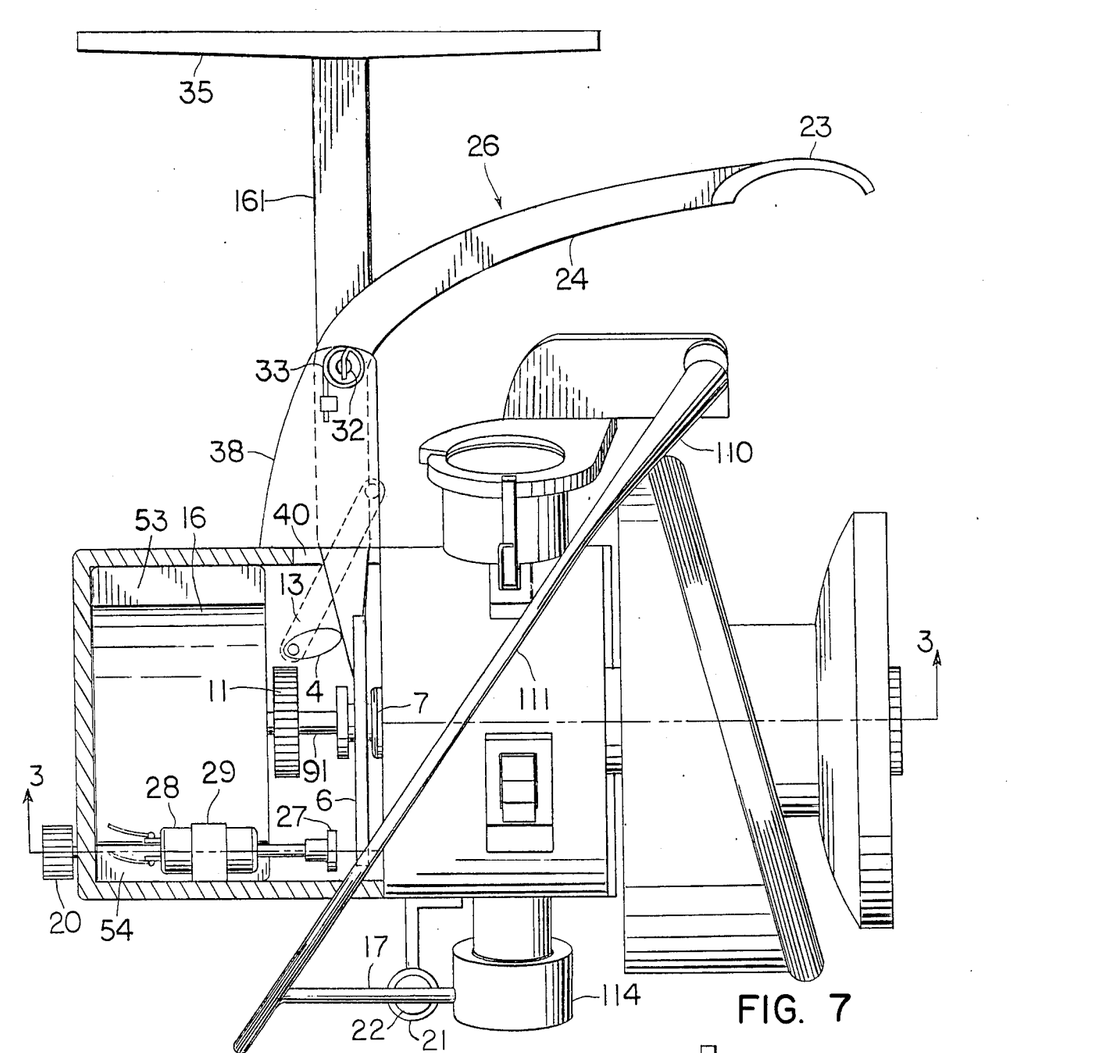
FIG. 7 is a side elevation view of the invention with the rear housing shown as a cross-sectional view taken vertically through the axis of the spindle shaft.

Control of the slidable clutch portion 7 is achieved by means of a trigger 26 (best seen in FIG. 7) operated by the index finger of the hand normally holding a rod and reel 2. Trigger 26 includes a finger grip portion 23, an arm portion 24, and a slotted portion 6, all forming a one piece unit. The grip portion includes a nonconvex roughened surface to inhibit slippage. The trigger is pivotally mounted between a bracket 38 and a mounting leg 161 which is adjacent the bracket. The latter two components extend upwardly from the top of rear housing 18. A slot 40 in housing 18 allows a lower portion of trigger 26 to pass into the housing. Trigger 26 pivots with a pin 32 which is received in aligned apertures in bracket 38, arm 24, and leg 161. A grooved portion of slidable clutch portion 7 is received in a slot in trigger portion 6 (FIGS. 3 and 7). Thus, when the trigger 26 is pivoted by the operator's finger, slidable clutch portion 7 can be moved in or out of engagement with gear/clutch 98,3. Trigger 26, therefore, moves between two positions: a clutch-engaged position and a clutch-disengaged position. A trigger spring 33, encircling pin 32, spring loads the trigger 26 so that the same is urged to the clutch-disengaged position.

Figure 8:
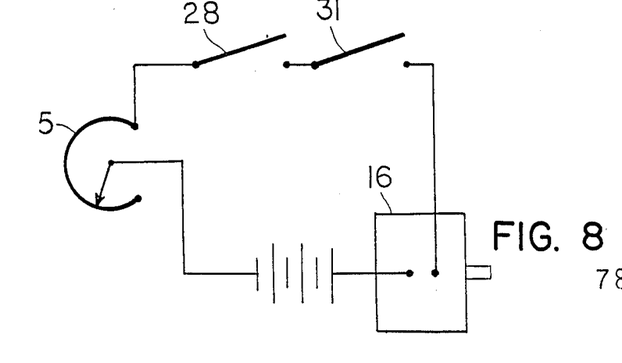
FIG. 8 is a diagram showing the manner in which the electrical components are connected.

Within a lower corner of housing 18 is a motor switch or conventional electrical switch 28 (FIG. 7) wired in series with motor 16 and the power source (FIG. 8). A bracket 29 holds the body of the switch 28 to the floor of housing 18. When a button 27 is pushed toward the body of the switch 28 (ON position), current flows through the switch when the circuit is otherwise closed. When button 27 is not pushed, a spring within the switch urges the button to an OFF position. Button 27 is positioned such that trigger portion 6 pushes the button to the ON position when the trigger 26 is released. As will be shown hereinafter, when a bail 111 (FIG. 1, 3, 4, 7) is in a line casting position and the trigger 26 is released, motor 16 is actuated and drives spindle shaft 91 and spool 94 in a line dispensing direction. Switch 28 is positioned relative to trigger 26 such that when the latter is pulled to halfway between its two limiting positions, the trigger is out of contact with button 27 which moves to the OFF position. When trigger 26 is further pulled to the clutch engaged-position, clutch portion 7 engages gear/clutch 98,3 so that line can be wound by means of the hand crank 80.

Also included in the invention is a means for releasably holding the trigger 26 in a clutch-engaged position without using the finger. It comprises a cam 4 (FIGS. 7 and 3) and a hand operated lever 13 which are fixed to a bar 9 (FIG. 3) journaled in housing 18. A lock ring 8 fits in a groove in bar 9 to hold the same in position. A drag spring 12 encircles the bar and is compressed between cam 4 and housing 18. Lever 13 pivots between an engaged position wherein cam 4 contacts and holds trigger arm 24 in the clutch-engaged position (FIG. 7), and a disengaged position wherein the cam is away from the trigger to free the same. The trigger holding device described in this paragraph is an optional feature and may be eliminated in a low cost embodiment of the invention.

Shown in FIG. 7 is a conventional mounting saddle 35 attached to leg 161.

The invention is disposed to retrieve casting line when mounted, utilizing the mounting saddle 35, to the handle of a casting rod (not shown). Line 105 passes over a rotatable guide 106 (FIG. 1), then over the elliptical rail 101 to spool core 32.

The rotation of hand crank 80 drives the rotation of shaft 86 due to the engagement of bevel gears 83,84. Consequently, the gears 85 and 69 drive the rotation of gears 99 and 98, respectively, which drive the rotation of support cup 90 (with rail 101), and spool 94, respectively. The preferred rotation rates are determined by standard gear speed formulae.

Casting line 105, being wound on spool 94, is guided by guide 106 to contact and cross rail 101 as the line is drawn to spool core 32. As the line 105 is drawn over the rotating rail 101, it is guided by the angled rail to traverse spool core 32 to result in even distribution of line on the spool.

The number of windings of casting line in each successive layer on the spool core is determined by the gear tooth ratios that result in the relatively different rates at which the spool 94 and rail 101 are driven. The number of windings per layer is equal to the rotational rate of the spool divided by twice the rotational rate of the elliptical rail.

Figure 6:
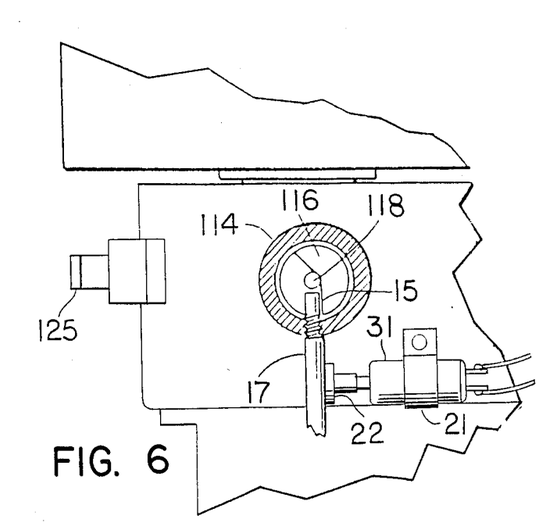
FIG. 6 is a partial view of the invention showing the bail pivot stop with the top of its housing cut away, the rotational axis of the bail being imagined as perpendicular to the page.

Guide 106 is a component of a line pick-up comprising a bail 111 which is substantially helically curved. Bail 111 is pivotally supported on housing 60. In a line retrieval position, the bail partially surrounds rail 101 and spool 94 (FIGS. 1, 3, 4, and 7). An end of a curved portion of the bail is fixedly received into the apex of a narrow angled cone 110. Mounted at the base of cone 110 is guide 106. The rim of guide 106 is shaped to form an annular groove in which the line is guided during winding. A shaft extending from the cone base, and threaded on one end, passes through the hub of guide 106 and is rigidly fastened to a lug 128 extending from a bail cam 112. A substantially straight bail portion 17 (FIG. 6 and 7) is fixed to the rear of a hinge comprising a pivotally mounted housing 114 (FIG. 4, 6 and 7) of a bail pivot stop 116. Mounted in this manner, the bail 111 has substantial helical pitch for guiding the line toward guide 106. The stop 116 is formed from a cylindrical projection, extending from housing 60, having a wedge-shaped portion removed therefrom. An edge 15 of the wedge-shaped void defines a limit to which the bail can pivot, thereby establishing the line retrieval position of the line pick-up. The housing 114 pivots about a screw 118 which is coaxially received into stop 116.

The bail cam 112 (FIGS. 1, 4 and 5) pivots about a screw 120 and incorporates two cam lobes. A first cam lobe 122 (FIG. 5) extends perpendicularly from a face of a plate 30 and is configured as a portion of a right cylinder having an axis in common with the pivotal axis of bail cam 112. A second cam lobe 124 (FIG. 1) extends peripherally from plate 30. Screw 120 is received into a cylindrical projection (FIG. 4) extending from housing 60 diametrically opposite stop 116.

Figure 1:
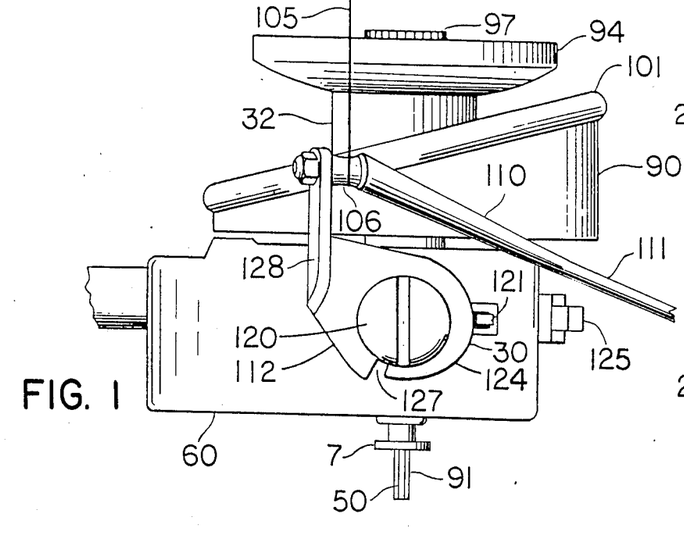
FIG. 1 is an auxiliary view of the invention showing the true shape of a face of the bail cam with the rotational axis of the bail imagined as perpendicular to the page, wherein portions of the bail and hand crank are broken away.
Figure 2:
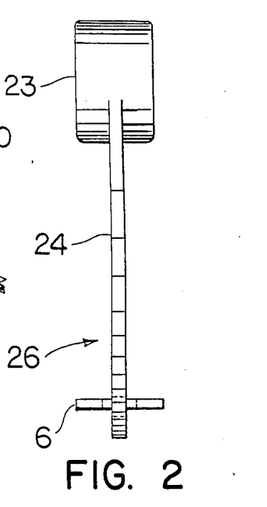
FIG. 2 is a top view of the trigger.
Figure 4:
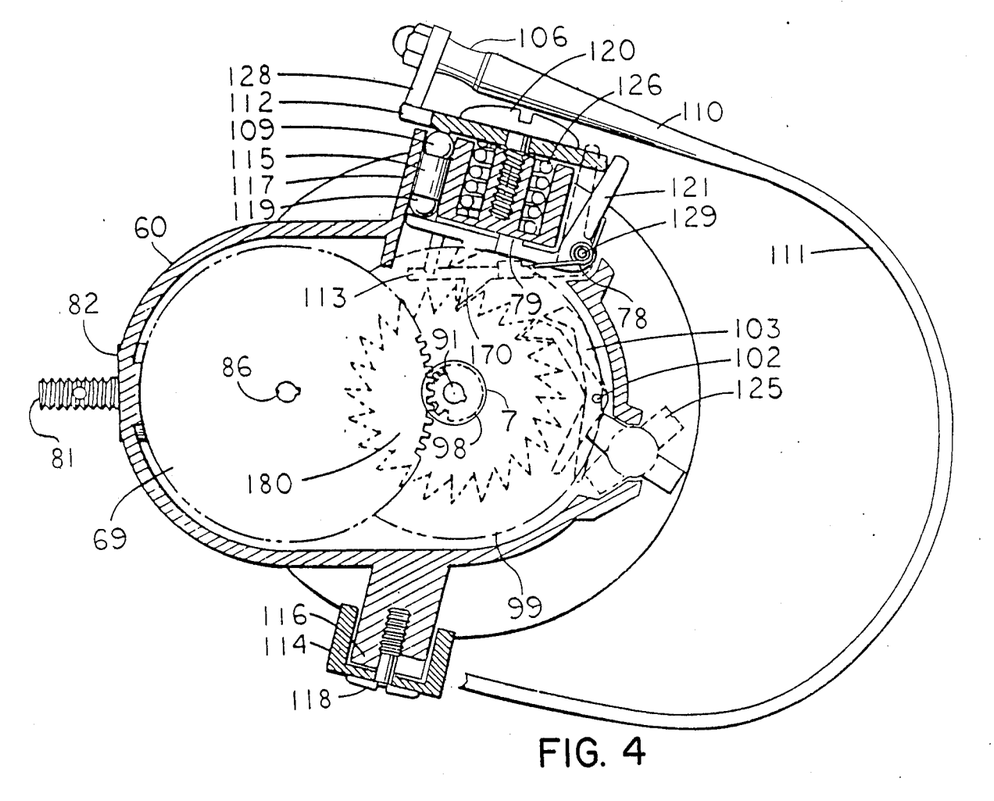
FIG. 4 is a cross-sectional view of the invention taken through the rotational axis of the bail system.
Figure 5:
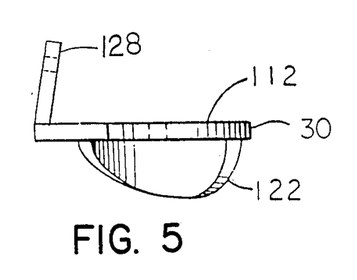
FIG. 5 is a side elevation view of the bail cam.

Encircling the pivotal axis of bail 111, beneath bail cam 112, is a torsion spring 126 (FIG. 4). One end of spring 126 is attached to bail cam 112 and an opposite end of the spring is attached to housing 60 such that bail 111 is urged toward the line retrieval position (FIGS. 1 and 7). When the bail pivots to that position, the bail pivot stop 116 stops the bail which is then held by the stop and the pressure of spring 126.

Mounted on the outer bottom of housing 60 is an electrical circuit switch or conventional switch 31 (FIG. 6) wired in series with motor 16, the switch 28, and the power source (FIG. 8). When a button 22 is pushed toward switch 31 (OFF position), no current can flow through the switch. When button 22 is not pushed, a spring within the switch urges the button to an ON position for current flow. Hence, switch button 22 operates in reverse of switch button 27. A bracket 21 holds the body of the switch 31 fixed to housing 60. Button 22 is positioned such that when bail 111 is in the line retrieval position, bail portion 17 holds the button in the OFF position. When the bail is in the line casting position, the button 22 is in the ON position.

In preparation for a cast, the user holds the line 105 against trigger 26 with his index finger and pivots the bail to a line casting position. As the bail is pivoted, the bail cam 112 pivots about its axis and the first cam lobe 122 compels a cam follower comprising a first ball 109 (FIG. 4), a hollow cylindrical piston 115, and a second ball 119, to move linearly within a tubular guide 117. Slots (not shown), in the wall of guide 117, allow the transverse passage of first cam lobe 122. The moving cam follower pivots an engaging lever or first pawl 113 which is pivotally mounted to housing 60 with a pivot pin 129. A slot (not shown) in the wall of guide 117 allows a distal portion of pawl 113 to move longitudinally of and within the guide. This results in the pawl tooth 170 engaging ratchet wheel 180.

As the bail reaches the line casting position-an arm 121, pivotaly mounted on pin 129 and engaged with second cam lobe 124, slides into a notch 127 (FIG. 1) in the second cam lobe. The arm 121 is urged into the notch 127 by a torsion spring 78 (FIG. 4). This locks the bail in the line casting position.

The cam follower cooperates with its associated components involved in the bail operation described above as follows: Piston 115 comprises a hollow cylinder having two open ends wherein ball 109, having a diameter greater than the inside diameter of the piston, is seated to revolve in an upper end portion of the piston. Ball 119, being equal in size to ball 109, is seated to revolve in a lower end portion of the piston. Ball 109 is engaged with cam lobe 122, and ball 119 is engaged with the distal portion of pawl 113.

When casting, the user flips the rod in a conventional manner and releases trigger 26 and the line wherein motor 16 turns ON and rotates spool 94 in the line dispensing direction. As the spool rotates, centrifugal force overcomes line peel resistance and line flows from the spool. About halfway through the cast, the user can pull trigger 26 to approximately halfway between its two limiting positions to shut off current to the motor. Flywheel action of the spool continues rotation of the same as the cast progresses. During this nonpowered phase of the cast, the nonenergized motor and gears progressively slow the spool rotation rate to prevent the same from exceeding the progressively slowing line peel rate (for simplicity of operation, the spool rotation rate is kept below the line peel rate).

When the cast is complete or nearly complete, the user can further pull the trigger which engages the clutch (engaging the clutch stops the rotating spool). He can then rotate hand crank 80 to automatically flip the bail for winding.

A user can maximize the lengths of the casts by adjusting the spool rotation rate (controlled with knob 20) and/or adjusting the length of the powered phase of the cast (controlled with trigger 26).

Figure 9:
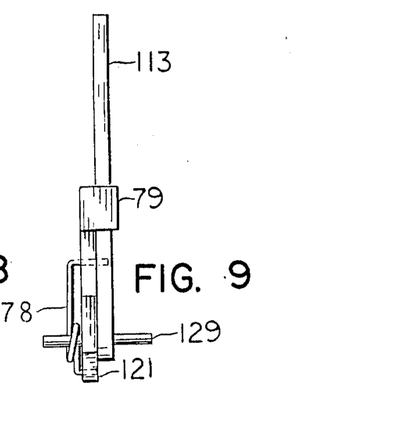
FIG. 9 is an enlarged top view of the arm and first pawl connected together by the pin and torsion spring.

Rotation of hand crank 80 rotates ratchet wheel 180 forward to disengage pawl 113 from the ratchet wheel and arm 121 from bail cam 112. This occurs as result of the following structure: Arm 121 is L-shaped and includes a tab 79 (FIGS. 4 and 9) which protrudes in a direction parallel to the axis of pin 129 (transversely over the top surface of pawl 113). The tab 79 can be envisioned as extending perpendicularly into the page of FIG. 4, across the top of pawl 113. Spring 78 connects arm 121 and pawl 113 such that the pawl is urged toward tab 79 to seat against the same. As the ratchet wheel 180 lifts the pawl 113, the same pushes upwardly under tab 79 to pivot arm 121 out of notch 127. Thus, bail 111 is released.

As spring 126 pivots bail 111 and bail cam 112 toward the line retrieval position, cam lobe 124 moves arm 121 further from the bail cam rotational axis. As arm 121 pivots, its connection to pawl 113 by way of spring 78 results in moving pawl 113 upwardly to clear tooth 170 away from ratchet wheel 180. Simultaneously, pawl 113 moves ball 119, piston 115, and ball 109 back to their original position. With bail 111 in the line retrieval position, the casting line is entrapped. The helical configuration of bail 111 allows the casting line to slide toward and into guide 106 as the line is tensioned by winding on spool 94. The portions of spool 94 and rail 101 encircled by bail 111 rotate toward guide 106 to assist in positioning the line thereat during winding.

An antireverse system includes a second pawl 103 (FIG. 4) pivotally mounted with a pin 102. The pawl 103 is spring loaded with a torsion spring 104 (FIG. 3) to urge pawl 103 to engage ratchet wheel 180 when a switch 125 is in an ON position. When the switch 125 is moved to an OFF position, its lever-action pivots pawl 103 out of engagement with ratchet wheel 180.

SUMMARY OF OPERATION

A user can wind line by holding the trigger 26 in the clutch-engaged position with the index finger of the same hand the holds the reel. The opposite hand turns the crank 80.

To cast, he holds the line 105 against trigger 26 with the mentioned index finger and pivots the bail 111 to the casting position. When casting, the user flips the rod in a conventional manner and releases trigger 26 and the line wherein motor 16 turns ON and rotates spool 94 in the line dispensing direction. As the spool rotates, centrifugal force overcomes line peel resistance and line flows from the spool. About halfway through the cast, the user can pull trigger 26 to approximately halfway between its two limiting positions to shut off current to the motor. Flywheel action of the spool continues rotation of the same as the cast progresses. During this nonpowered phase of the cast, the nonenergized motor and gears progressively slow the spool rotation rate to prevent the same from exceeding the progressively slowing line peel rate (for simplicity of operation, the spool rotation rate is kept below the line peel rate).

When the cast is complete or nearly complete, the user can further pull the trigger which engages the clutch (engaging the clutch stops the rotating spool). He can then rotate hand crank 80 to automatically flip the bail for winding.

A user can maximize the lengths of the casts by adjusting the spool rotation rate (controlled with knob 20) and/or adjusting the length of the powered phase of the cast (controlled with trigger 26).

In addition to longer casts, the spool rotations prevent line twist that would normally occur when untwisted line is payed off axially of a spool. If the spool rotation rate and the line peel rate are the same; that is, if there is one complete rotation of the spool for each complete loop of line that peels therefrom, no twist will occur in the cast line.

However, it is not necessary for the two rates to be matched for the system to correct line twist. Though some twist occurs in the cast line when the two rates differ, the cast line untwists as it is reeled back on the spool. This occurs when using high test strength lines, such as braided lines of 30 lb. test or greater, with a swivel attached to the distal end of the line. During winding, twist in the line is transmitted longitudinally toward the distal end where it spins out at the swivel. Thus, after retrieval, the spooled line has no significant twist, even if the spool rotation rate during the cast is zero. Hence, unpowered casts with this invention or with the related invention, U.S. Pat. No. 4,577,807, will result in the retrieved line being without any significant twist when using the line system described.

Optional conveniences include the feature of locking the trigger 26 in the clutch-engaged position with lever 13. The user may choose to do this, for example, if he doesn't intend to cast for a while. If he prefers, he can release trigger 26 to the clutch-disengaged position without causing the motor to run by leaving the bail in the line retrieval position. He may do this, for example, to draw line from the reel without energizing the motor.

He can adjust the drag with knob 97 and/or set the antireverse with switch 125.

MODIFICATIONS OF THE INVENTION

An alternative method of controlling the motor operation is with an integrated circuit (IC). For example, an IC could be devised to stop energizing the motor when or after the spool reaches a predetermined maximum rotation rate. This can be accomplished by programming the IC to shut off the current when or after the time required to reach maximum spool speed has lapsed. As explained hereinbefore, the spool would then continue to rotate due to inertia but at a slowing rate. When the cast object reaches the target area, the spool can be stopped by means of the trigger as described hereinbefore.

Still another electronic method of controlling the spool operation during the cast is to provide an IC that will regulate the proper amounts of electric current to the motor throughout the cast. The current would be relatively high at the beginning and progressively decrease as the cast progresses so that the spool speed will act accordingly. A profile of the decreasing current levels (a cast profile) that will accomplish this can be provided by first measuring and recording the line peel rate history throughout a test cast. For example, peel rate samples can be recorded at small increments of time through the course of the cast. The process can be repeated for each of several test casts of different lengths. A set of peel rate values could then be permanently stored in the IC for each test cast. The IC would be programmed to provide input to an electronic motor drive that would supply the motor with a profile of current levels computed from a stored set of peel rate values. That would produce spool rotation rates that correspond to the line peel rates at the respective time increments. The sets of line peel rates and the program would be permanently stored in the system by the manufacturer. A multiple selection switch would be connected to the IC such that a user could select a cast profile for a cast length that he prefers.

No harm would be done if the cast profile that he selects does not match his actual performed cast. For example, if his performed cast is longer than his selected profile, the spool would stop prematurely and the extra line needed would simply peel off of the unpowered spool. If his performed cast is shorter than his selected profile, he could stop the spool at the end of the cast with the trigger, thereby preventing any extra slack in his cast line. After a few trial casts, a beginning user would quickly learn which cast profile to select for his particular needs in order to maximize performance.

A circuit for the modification described above is shown in FIG. 10. An electronic motor drive 204 includes an analog drive. An IC, comprising a microprocessor 202, in concert with the motor drive 204 controls current levels to the motor 16. As mentioned, the system would be programmed to compute a cast profile from a stored set of peel rate values for a cast of a particular length. The cast selection is made by way of a multiple selection switch 206 connected to the IC by conventional means. The system is actuated when the switches 28 and 31 are closed (ON) as result of the operations described.

Figure 10:
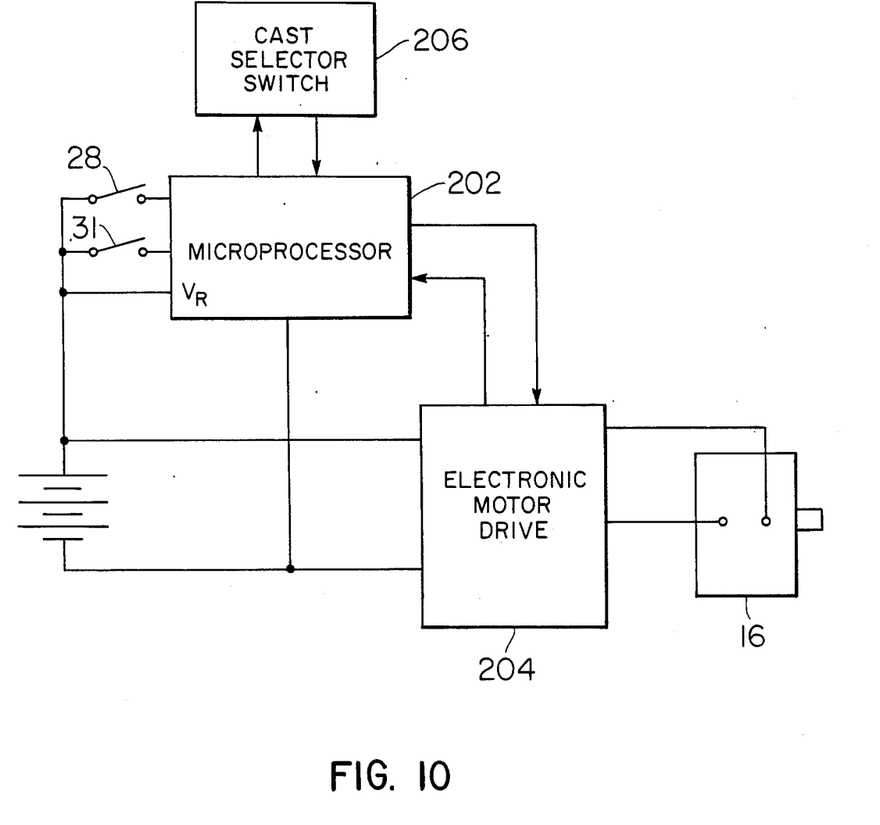
FIG. 10 is a diagram showing the manner in which electrical components are connected in a modification of the invention.

A system similar to that of FIG. 10 can used for the first described modification, except that the switch 206 would not be needed.

It should be noted that if the invention is mounted on a powered line launching device, the actuator switch 28 can be mounted remote from reel in cooperation with the trigger of the launcher. The switch 28 and the launcher trigger can be arranged to start the motor 16 when, or slightly before, the line is launched.

It is possible for electric motor 16 to be replaced with a clock spring motor (not shown). The clock spring need only power the spool during a beginning portion of the cast. Once the spool is up to speed, a free-wheel mechanism or the flywheel action of the spool can continue rotating the same through the remainder of the cast (without further drive from the spring).

The clock spring could be wound by the hand crank 80, during line winding, by way of a gear train. An appropriate clutch could be used to allow the crank to slip out of engagement with the clock spring when the same is fully wound, wherein line winding could continue.

If a launching device on which the invention is mounted is powered by a source of compressed gas, the electric motor 16 could be replaced by a motor which can be powered by the same compressed gas source.

The preceding description is given to illustrate the invention and not to limit the same. It is understood that various modifications may be made without departing from the spirit of the invention as claimed.

What is claimed is:

1. An apparatus for line casting and reeling comprising:
    a stationary housing;
    a spool rotatably supported on the housing, the spool supported such that line wound upon the spool can pay-off longitudinally of the spool rotational axis during a line cast;
    a line traversing cam encircling the spool and having a common axis with the spool, the cam including an endless rail positioned at an oblique angle relative to the spool rotational axis, the cam mounted to rotate at a relatively different speed than the spool;
    means for driving the spool and the line cam to rotate such that the rotation rate of the spool is greater than the rotation rate of the line cam; and
    a line pick-up mounted to the housing adjacent the line cam, the line pick-up being movable between a line engaged retrieval position and a line disengaged casting position.

2. An apparatus for line casting and reeling comprising:
    a stationary housing;
    a spool rotatably supported on the housing, the spool supported such that line wound upon the spool can pay-off longitudinally of the spool rotational axis during a line cast;
    means for driving the spool to rotate;
    a nonspinning line pick-up pivotally supported on the housing, the pick-up being movable between a line engaged retrieval position and a line disengaged casting position;
    means for urging the line pick-up to pivot from the line casting position to the line retrieval position;
    a bail cam pivotally supported and connected to the line pick-up, the bail cam comprising a plate having a first cam lobe positioned for communicating motion in a direction substantially parallel to the pivotal axis of the cam, the plate including a portion defining a notch;
    an arm movably supported and engagable in the notch for releasably locking the line pick-up in the line casting position;
    means for urging the arm to engage in the notch when the line pick-up is pivoted to the line casting position;
    a driven cam rotatably supported and connected with the spool driving means so that the former is driven by the latter; and
    an engaging lever being movably connected with the arm such that the lever and arm are movable relative to each other, the lever being engageable with the driven cam such that when engaged as the cam is driven the lever compels the arm to disengage from the notch to release the line pick-up, the lever being connected with the first cam lobe such that as the line pick-up moves to the line casting position the lever engages the driven cam.

3. The apparatus for line casting and reeling as defined in claim 2, wherein the first cam lobe and the lever are connected by a cam follower comprising:
    a piston;
    a first ball seated to revolve in an end portion of the piston, the first ball engaging the first cam lobe; and a second ball seated to revolve in an opposite end portion of the piston, the second ball engaging the lever.

4. The apparatus for line casting and reeling as defined in claim 2, wherein the arm and lever are pivotally supported and have a common pivotal axis.

5. The apparatus for line casting and reeling as defined in claim 2, wherein the lever is connected to the arm by a spring so that the lever and arm move together and yieldingly move relative to each other.

6. The apparatus for line casting and reeling as defined in claim 5, wherein the bail cam includes a second cam lobe which engages the arm such that as the bail pivots to the line retrieval position the arm compels the lever to disengage from the driven cam.

7. An apparatus for line casting and reeling comprising:
   a housing;
   a spool rotatably supported on the housing, the spool supported such that line wound upon the spool can pay-off longitudinally of the spool axis during a line cast;
   means for traversing line so that the line is evenly distributed upon the spool during winding;
   a motor drivingly connected to the spool;
   a clutch connecting the line traversing means with the spool;
   means for operating the clutch such that the line traversing means is disconnected from the spool during a cast; and
   means for actuating the motor to rotate the spool in a line dispensing direction during a cast.

8. The apparatus for line casting and reeling as defined in claim 7, wherein the means for operating the clutch comprises a trigger supported on the housing, the trigger being movable between a clutch-engaged position and a clutch-disengaged position, the trigger being connected with the clutch such that moving the trigger to the clutch-engaged position connects the line traversing means with the spool, and moving the trigger to the clutch-disengaged position disconnects the line traversing means from the spool.

9. The apparatus for line casting and reeling as defined in claim 8, wherein the means for actuating the motor to rotate the spool comprises a motor switch operatively connected with the motor and with the trigger such that when the same is in the clutch-disengaged position the motor is actuated.

10. The apparatus for line casting and reeling as defined in claim 8, further comprising:
    a spring positioned for urging the trigger to the clutch-disengaged position; and
    the trigger having a finger grip portion positioned above and adjacent the spool so that the line may be held against the grip portion when the trigger is in the clutch-engaged position wherein the line and trigger may be simultaneously released for a cast whereby the spring moves the trigger to the clutch-disengaged position.

11. The apparatus for line casting and reeling as defined in claim 8, further comprising:
    a cam supported on the housing and movable between an engaged position and a disengaged position, the cam in the engaged position engaging the trigger to hold the same in the clttch-engaged position and the cam in the disengaged position being disengaged from the trigger; and
    means for selectively moving the cam to the engaged and disengaged positions.

12. The apparatus for line casting and reeling as defined in claim 8, further comprising:
    a line pick-up supported on the housing, the pick-up being movable between a line engaged retrieval position and a line disengaged casting position; and
    means for de-activating the motor when the line pick-up is in the retrieval position such that the motor is idle at all positions of the trigger.

13. An apparatus for line casting and reeling comprising:
    a housing;
    a hand crank for winding line;
    a spool rotatably supported on the housing, the spool supported such that line wound upon the spool can pay-off longitudinally of the spool axis during a line cast;
    a motor drivingly connected to the spool;
    a clutch drivingly connecting the hand crank with the spool such that when connected the spool can be driven to rotate by the hand crank for winding;
    means for operating the clutch such that the hand crank is disconnected from the spool during a cast; and
    means for actuating the motor to rotate the spool in a line dispensing direction during a cast.

14. The apparatus for line casting and reeling as defined in claim 13, wherein the means for operating the clutch comprises a trigger supported on the housing, the trigger being movable between a clutch-engaged position and a clutch-disengaged position, the trigger being connected with the clutch such that moving the trigger to the clutch-engaged position connects the hand crank with the spool and moving the trigger to the clutch-disengaged position disconnects the hand crank from the spool.

15. The apparatus for line casting and reeling as defined in claim 14, further comprising a line traversing cam encircling the spool, the line cam comprising an endless rail mounted at an oblique angle relative to the spool axis and the rail being rotatably supported about a common axis with the spool, the line cam being connected with the clutch such that when the trigger is in the clutch-engaged position rotation of the crank compels the spool and the line cam to rotate, and when the trigger is in the clutch-disengaged position the line cam is disconnected from the spool by the clutch.

16. An apparatus for line casting and reeling comprising:
    a housing;
    a hand crank for winding line;
    a spool rotatably supported on the housing, the spool supported such that line wound upon the spool can pay-off longitudinally of the spool axis during a line cast;
    means for traversing line so that the line is evenly distributed upon the spool during winding;
    a motor drivingly connected to the spool;
    a clutch connecting the hand crank and the line traversing means with the spool;
    means for operating the clutch such that the hand crank and the line traversing means are disconnected from the spool during a cast; and
    means for actuating the motor to rotate the spool in a line dispensing direction during a cast.

17. The apparatus for line casting and reeling as defined in claim 16, wherein the means for operating the clutch comprises a trigger supported on the housing, the trigger being movable between a clutch-engaged position and a clutch-disengaged position, the trigger being connected with the clutch such that moving the trigger to the clutch-engaged position connects the hand crank and the line traversing means with the spool and moving the trigger to the clutch-disengaged position disconnects the hand crank and the line traversing mean from the spool.

18. The apparatus for line casting and reeling as defined in claim 16, further comprising a line pick-up supported on the housing, the pick-up being movable between a line engaged retrieval position and a line disengaged casting position.

19. The apparatus for line casting and reeling as defined in claim 18, wherein the crank is connected with the line pick-up such that rotation of the crank actuates the line pick-up to move from the line casting position to the line retrieval position.

20. An apparatus for line casting and reeling comprising:
a housing;
a spindle shaft rotatably supported on the housing;
a spool coaxially supported on the spindle shaft, the spool supported such that line wound upon the spool can pay-off longitudinally of the spool axis during a line cast;
a motor drivingly connected to the spindle shaft;
a clutch having a receiving portion coaxially supported on the spindle shaft such that the latter can rotate independently of the former, the clutch having a slidable portion keyed to the spindle shaft and axially slidable thereon;
means for moving the clutch slidable portion to engage the clutch receiving portion wherein one clutch portion drives the other to rotate;
means for actuating the motor to rotate the spool when the clutch is disengaged;
a hand crank rotatably supported on the housing; and
means for drivingly connecting the crank with the one of the clutch portions such that rotation of the crank compels the spool to rotate when the clutch is engaged.

21. An apparatus for line casting and reeling comprising:
a housing;
a spool rotatably supported on the housing, the spool supported such that line wound upon the spool can pay-off longitudinally of the spool axis during a line cast;
a motor drivingly connected to the spool;
a trigger supported on the housing, the trigger movable between a motor OFF position and a motor ON position, the trigger having a finger grip positioned above and adjacent the spool and the grip having a surface for receiving and holding line thereon such that the line and trigger can be simultaneously released for a cast, the surface being nonconvex to inhibit line slippage;
resilient means for urging the trigger to move to the motor ON position; and
means for actuating the motor to rotate the spool in a high speed line dispensing direction when the trigger is in the motor ON position.

22. An apparatus for line casting and reeling comprising:
a housing;
a spool rotatably supported on the housing, the spool supported such that line wound upon the spool can pay-off longitudinally of the spool axis during a line cast;
a motor drivingly connected to the spool;
a source of electric power;
an electric circuit switch;
an electronic motor drive including an analog drive; and
a microprocessor connected with the motor drive, the switch, the electric power source and the motor, the combination being connected such that electric power is supplied to the motor to energize the same wherein the supply is controlled by the microprocessor, the microprocessor being programmed to supply power when the switch is ON at approximately the beginning of a cast and to shut off the supply after a predetermined amount of time.

23. An apparatus for line casting and reeling comprising:
a housing;
a spool rotatably supported on the housing, the spool supported such that line wound upon the spool can pay-off longitudinally of the spool axis during a line cast;
a motor drivingly connected to the spool;
a source of electric power;
an electric circuit switch;
an electronic motor drive including an analog drive; and
a microprocessor connected with the motor drive, the switch, the electric power source and the motor, the combination being connected such that electric power is supplied to the motor to energize the same wherein the supply is controlled by the microprocesor, the microprocessor being programmed to supply a predetermined maximum amount of power when the switch is ON at approximately the beginning of a cast and to progressively decrease the power during the cast.

24. A method of casting with a reel of the type in which a spool is supported such that line wound upon the spool can pay off longitudinally of the spool rotational axis during a line cast, which comprises driving the spool to rotate, by means of a motor connected to the spool, in a line dispensing direction during the cast when a line pick-up is in a line disengaged casting position.

25. A method as defined in claim 24, wherein driving the spool to rotate is started at a fraction of a second before the beginning of the cast.

26. A method as defined in claim 24, which further comprises reducing the spool rotation rate by progressively decreasing amounts during the cast.

27. A method as defined in claim 26, wherein reducing the spool rotation rate by progressively decreasing amounts during the cast, is carried out by de-energizing the motor and allowing friction to progressively reduce the spool rotation rate.

28. A method as defined in claim 24, which further comprises stopping the spool rotations selectively after the beginning of the cast.

29. A method of casting with a reel of the type in which a spool is supported such that line wound upon the spool can pay off longitudinally of the spool rotational axis during a line cast, which comprises driving the spool to rotate, by means of a motor connected to the spool, in a line dispensing direction during the cast, the method further comprising decoupling the spool from a hand crank when the spool is driven to rotate by the motor.

30. A method of casting with a reel of the type in which a spool is supported such that line wound upon the spool can pay off longitudinally of the spool rotational axis during a line cast, which comprises driving the spool to rotate, by means of a motor connected to the spool, in a line dispensing direction during the cast, the method further comprising decoupling the spool from a line traversing means when the spool is driven to rotate by the motor.

* * * * *